(12) United States Patent
Seguchi et al.

(10) Patent No.: US 12,225,843 B2
(45) Date of Patent: Feb. 18, 2025

(54) CONTROL DEVICE, WORK MACHINE, AND WORK SYSTEM

(71) Applicant: HONDA MOTOR CO., LTD., Tokyo (JP)

(72) Inventors: Haruna Seguchi, Wako (JP); Shuhei Maruyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 253 days.

(21) Appl. No.: 17/889,926

(22) Filed: Aug. 17, 2022

(65) Prior Publication Data
US 2022/0386523 A1 Dec. 8, 2022

Related U.S. Application Data

(63) Continuation of application No. PCT/JP2020/008140, filed on Feb. 27, 2020.

(51) Int. Cl.
*A01D 34/00* (2006.01)
*A01D 101/00* (2006.01)
*G05D 1/00* (2024.01)

(52) U.S. Cl.
CPC ......... *A01D 34/008* (2013.01); *G05D 1/0265* (2013.01); *A01D 2101/00* (2013.01)

(58) Field of Classification Search
CPC ............. A01D 34/008; A01D 2101/00; G05D 1/0225; G05D 1/0259; G05D 1/0265;
(Continued)

(56) References Cited

U.S. PATENT DOCUMENTS 5,938,707 A 8/1999 Uehara
9,795,074 B2 * 10/2017 Stratton ............... A01B 79/005
(Continued)

FOREIGN PATENT DOCUMENTS

JP S57-067505 U1 4/1982
JP 05119831 A * 5/1993
(Continued)

OTHER PUBLICATIONS

English translation of JP-05119831 (Year: 1993).*
International Search Report and Written Opinion for PCT/JP2020/008140 mailed Mar. 31, 2020.

*Primary Examiner* — Russell Frejd
*Assistant Examiner* — Brandon Z Willis
(74) *Attorney, Agent, or Firm* — Thomas | Horstemeyer, LLP

(57) ABSTRACT

An aspect of the present invention is a control device for performing travel control of a work machine, the work machine executes work while traveling in a work region based on a reference line, and the control device comprises a setting unit that sets a distance from the reference line, a first control unit that controls the work machine to travel along a first virtual line, the first virtual line being a virtual line away from the reference line on one side, a second control unit that controls the work machine to travel along a second virtual line, the second virtual line being a virtual line away from the reference line on another side, and a selection unit that selects one of the control by the first control unit and the control by the second control unit.

18 Claims, 8 Drawing Sheets

(58) Field of Classification Search
CPC .............. G05D 1/0263; G05D 1/0219; G05D 2105/12; G05D 2105/15; G05D 2105/10; G05D 2107/21; G05D 2107/23; A01B 69/00; A01B 69/002; A01B 69/007; A47L 2201/02; B60W 2300/15; B60W 2420/50; E01H 5/04

See application file for complete search history.

(56) References Cited

U.S. PATENT DOCUMENTS

| | | | |
|---|---|---|---|
| 10,268,206 B2 | 4/2019 | Yamamura | |
| 11,325,615 B2 | 5/2022 | Fujii et al. | |
| 11,332,160 B2 | 5/2022 | Fujii et al. | |
| 2005/0197757 A1* | 9/2005 | Flann | G05D 1/0219 701/50 |
| 2015/0331423 A1* | 11/2015 | Volger | A01B 69/008 701/25 |
| 2017/0285653 A1* | 10/2017 | Yamamura | A01D 34/008 |
| 2020/0026305 A1 | 1/2020 | Maekawa et al. | |
| 2020/0275604 A1* | 9/2020 | Chen | G01S 19/43 |
| 2020/0317229 A1 | 10/2020 | Fujii et al. | |
| 2020/0317230 A1 | 10/2020 | Fujii et al. | |
| 2020/0320882 A1 | 10/2020 | Fujii et al. | |
| 2021/0112708 A1 | 4/2021 | Kameyama et al. | |
| 2022/0183211 A1* | 6/2022 | Kinuta | G05D 1/0061 |
| 2022/0240444 A1* | 8/2022 | Wang | G05D 1/0259 |

FOREIGN PATENT DOCUMENTS

| | | |
|---|---|---|
| JP | H05-119831 A | 5/1993 |
| JP | H08-050511 A | 2/1996 |
| JP | H09-062346 A | 3/1997 |
| JP | 2017-182634 A | 10/2017 |
| JP | 2018-018146 A | 2/2018 |
| JP | 2019-036073 A | 3/2019 |
| WO | 2019/026921 A1 | 2/2019 |
| WO | 2019/124539 A1 | 6/2019 |
| WO | 2019/187122 A1 | 10/2019 |
| WO | 2021/171513 A1 | 9/2021 |

* cited by examiner

CONTROL DEVICE, WORK MACHINE, AND WORK SYSTEM

CROSS-REFERENCE TO RELATED APPLICATION(S)

This application is a continuation of International Patent Application No. PCT/JP2020/008140 filed on Feb. 27, 2020, the entire disclosures of which are incorporated herein by reference.

TECHNICAL FIELD

The present invention relates to a control device mainly for performing travel control of a work machine.

BACKGROUND ART

Some work machines (for example, lawn mowers) detect a work region by themselves and execute work (for example, lawn mowing) while traveling in the work region. Patent Literatures 1 and 2 describe traveling in a work region based on a power line installed in the work region. The power line generates an electromagnetic wave as a signal indicating a work region and functions as a reference line for specifying the work region. Such a work machine can also be referred to as a self-propelled work machine, an unmanned traveling work machine, or the like.

CITATION LIST

Patent Literature

PTL 1: Japanese Patent Laid-Open No. 2017-182634
PTL 2: Japanese Patent Laid-Open No. 8-50511

SUMMARY OF INVENTION

Technical Problem

Depending on geographical conditions, an outer shape of the above-described work region may be complicated, and as an example, the work region may have a shape partially extending in a form like a passage (so-called a narrow path). Even in such a case, further improvement may be required so that work efficiency by a work machine is improved.

An exemplary object of the present invention is to improve work efficiency even when an outer shape of a work region becomes complicated.

Solution to Problem

A first aspect of the present invention relates to a control device for performing travel control of a work machine, the work machine executes work while traveling in a work region based on a reference line installed in the work region; and the control device includes: a setting unit that sets a distance from the reference line; a first control unit that controls the work machine to travel along a first virtual line, the first virtual line being a virtual line away from the reference line on one side by the distance set by the setting unit; and a second control unit that controls the work machine to travel along a second virtual line, the second virtual line being a virtual line away from the reference line on another side by the distance set by the setting unit; and a selection unit that selects one of the control by the first control unit and the control by the second control unit.

Advantageous Effects of Invention

According to the present invention, work efficiency can be improved even when an outer shape of a work region becomes complicated.

DESCRIPTION OF EMBODIMENTS

Figure 1:
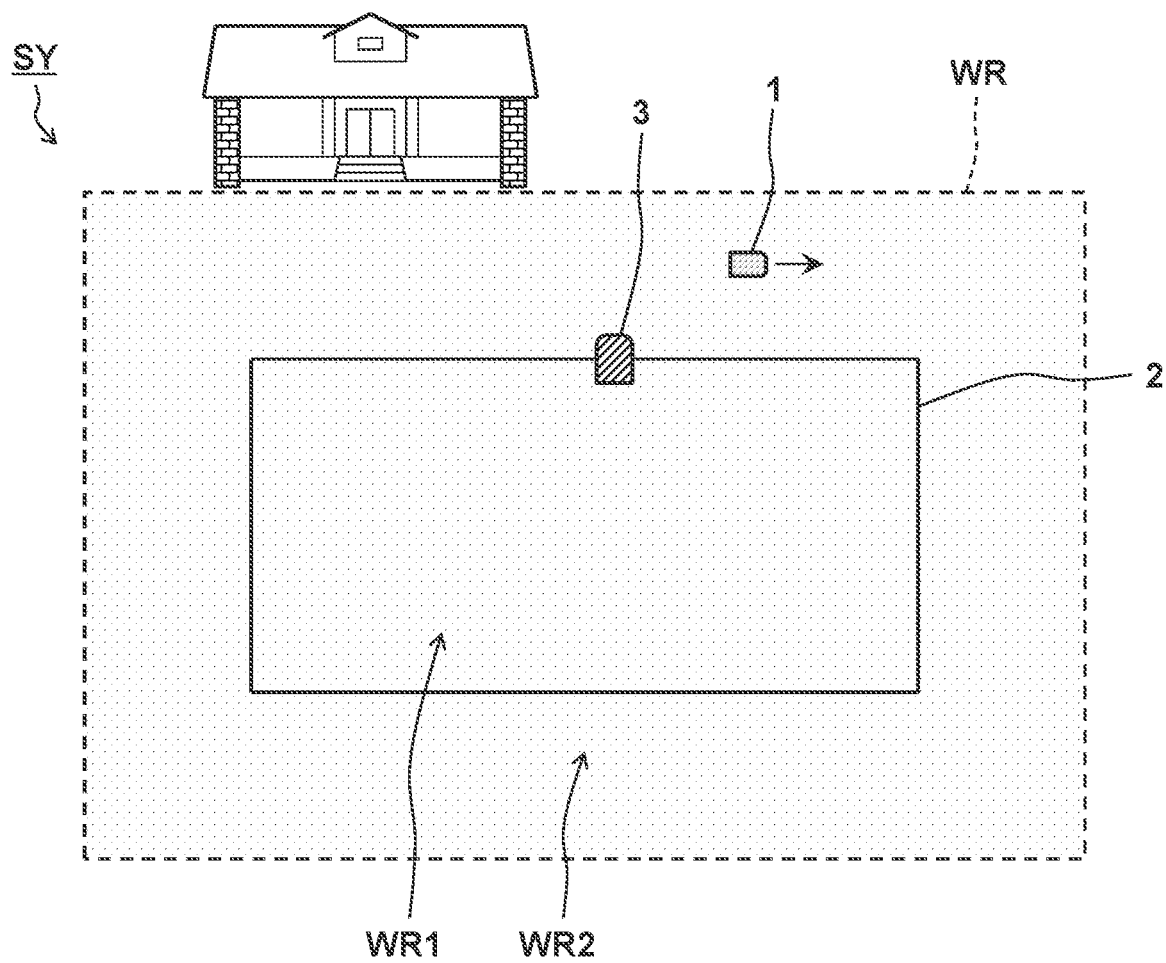
FIG. 1 is a diagram illustrating a configuration example of a work system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Configuration Example of Work System

FIG. 1 illustrates a configuration example of a work system SY according to an embodiment. The work system SY includes a work machine 1, a power line 2, and a station 3. Although details will be described later, the work machine 1 executes predetermined work while traveling in a work region WR based on the power line 2 and waits at the station 3 while not executing the work.

Figure 2:
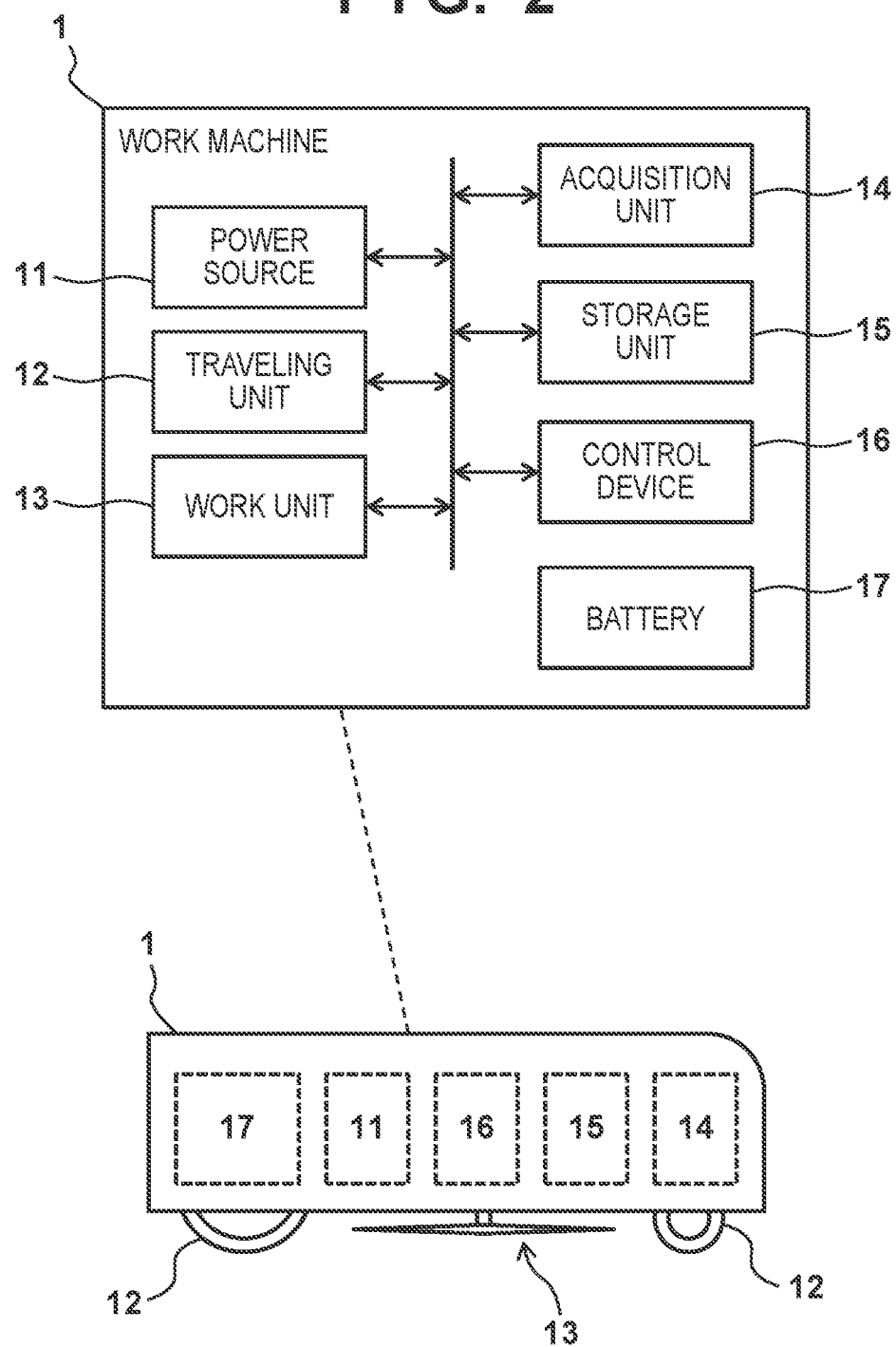
FIG. 2 is a diagram illustrating a configuration example of a work machine.

FIG. 2 illustrates a configuration example of the work machine 1. The work machine 1 includes a power source 11, a traveling unit 12, a work unit 13, an acquisition unit 14, a storage unit 15, a control device 16, and a battery 17.

The power source 11 generates power (rotation) for driving the work unit 12 and the traveling unit 13. In the present embodiment, an electric motor such as a three-phase induction motor is used as the power source 11, and the electric motor is driven based on electric power from the battery 17 to be described later. In the present embodiment, it is assumed that the single power source 11 generates power for both the work unit 12 and the traveling unit 13, but in another embodiment, a power source that generates power for the work unit 12 and a power source that generates power for the traveling unit 13 may be separately provided. In this case, an electric motor may be used as one power source, and an internal combustion engine may be used as the other power source.

The traveling unit 12 causes the work machine 1 to travel based on power of the power source 11. In the present embodiment, it is assumed that the traveling unit 12 includes a pair of left and right rear wheels that are drive wheels and a pair of left and right front wheels that are driven wheels. For example, when the pair of left and right rear wheels rotate at an equal rotation speed and in a forward direction, the work machine 1 moves forward (goes straight). When the pair of left and right rear wheels rotate at different rotation speeds and in a forward direction, the work machine 1 turns (left turn or right turn). The traveling unit 12 may adopt another structure such as a crawler traveling body instead of the above-described structure capable of realizing four-wheel traveling.

The work unit 13 is provided in a lower portion of a vehicle body of the work machine 1 and is configured to execute predetermined work based on the power of the power source 11. In the present embodiment, it is assumed that a work content is lawn mowing work and that the work unit 13 includes a lawn mowing blade which is rotatable based on the power of the power source 11 and a lifting mechanism which can lift and lower the blade. For example, the work unit 13 lowers a working blade to be put into a rotating state (operating state) when executing work and raises the blade to be put into a non-rotating state (resting state) when not executing work.

Although described in detail later, the acquisition unit 14 is configured to acquire work information (information or a signal necessary for execution of work). For example, the acquisition unit 14 acquires an electromagnetic wave generated by the power line 2 as a signal indicating the work region WR and acquires information for determining a travel route during work from the station 3. From this viewpoint, it can also be said that the acquisition unit 14 has a function as a detection unit for detecting the electromagnetic wave or the signal of the power line 2 and a function as a communication unit for communicating with the station 3.

Although details will be described later, the storage unit 15 stores information related to travel routes. For the storage unit 15, it is only necessary that a non-volatile memory such as an EEPROM, or a volatile memory such as a DRAM and an SRAM be used.

The control device 16 functions as a system controller that controls an entire operation of the work machine 1. For example, the control device 16 performs drive control of the traveling unit 12 and the work unit 13 (that is, travel control and execution of work of the work machine 1). In the present embodiment, it is assumed that the control device 16 is a processor including a CPU and a memory and that functions of the control device 16 are realized by executing a predetermined program. In another embodiment, the control device 16 may be configured to include a semiconductor device such as a programmable logic device (PLD) or an application specific integrated circuit (ASIC). In short, the functions of the control device 16 can be realized by both software and hardware.

The battery 17 can supply electric power to the power source 11. Although details will be described later, the battery 17 can be charged by the station 3 to be described later. For the battery 17, it is only necessary that a secondary battery such as a lithium-ion battery or a lead storage battery be used.

Referring again to FIG. 1, the power line 2 is installed (buried or laid) in the work region WR and generates an electromagnetic wave based on predetermined power. The work machine 1 detects an electromagnetic wave using a function of the acquisition unit 14 as a detection unit and executes work while traveling in the work region WR based on the electromagnetic wave. Here, the electromagnetic wave can be interpreted in a broad sense, and a concept thereof includes light, radio waves, and the like. From this viewpoint, it can be said that the electromagnetic wave generated by the power line 2 is a signal indicating the work region WR, that is, the power line 2 functions as a reference line for specifying the work region WR.

Figure 3A:
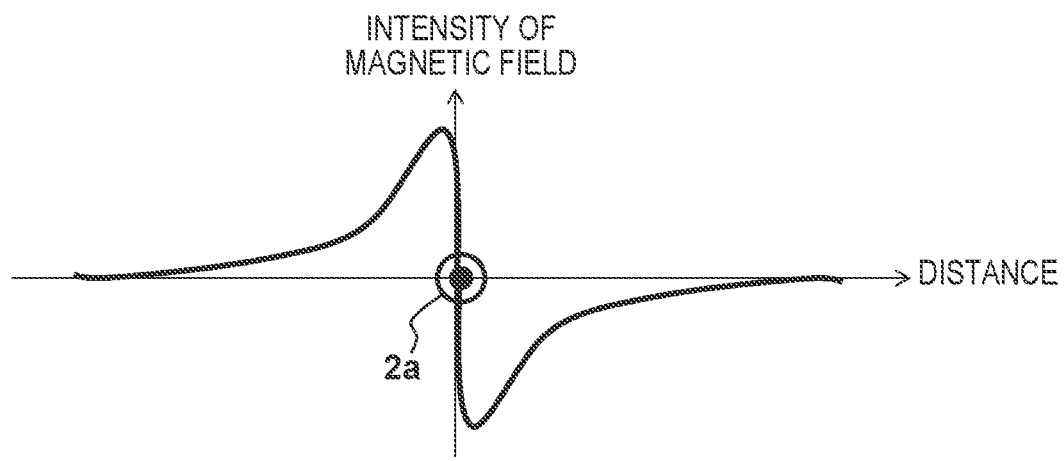
FIG. 3A is a diagram illustrating an example of intensity distribution of an electromagnetic wave generated by a power line.
Figure 3B:
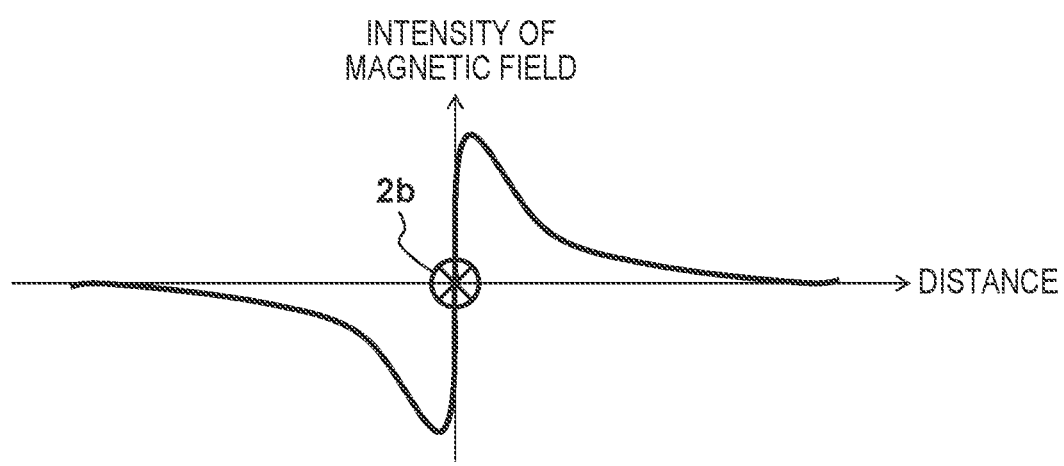
FIG. 3B is a diagram illustrating an example of intensity distribution of an electromagnetic wave generated by a power line.

FIGS. 3A and 3B illustrate an intensity distribution indicating a relationship between an intensity (signal value) of the electromagnetic wave generated by the power line 2 and a distance from the power line 2. A pulse current of a predetermined cycle (a plurality of DC currents in a relatively short period) is intermittently supplied from the station 3 to the power line 2, and during that time, a predetermined electromagnetic wave is generated from the power line 2.

In FIG. 3A, it is assumed that a pulse current flows in the power line 2 from a back side to a front side in the drawing (denoted as "power line 2*a*" for distinction). As a result, as the electromagnetic wave, a downward magnetic field (set as a magnetic field of a positive electrode) is generated on a left side of the power line 2*a*, and an upward magnetic field (set as a magnetic field of a negative electrode) is generated on a right side of the power line 2*a*.

In FIG. 3B, it is assumed that a pulse current flows in the power line 2 from the front side to the back side in the drawing (denoted as "power line 2*b*" for distinction). As a result, as the electromagnetic wave, an upward magnetic field (set as a magnetic field of a positive electrode) is generated on a left side of the power line 2*b*, and a downward magnetic field (set as a magnetic field of a negative electrode) is generated on a right side of the power line 2*b*.

As can be seen from FIGS. 3A and 3B, an absolute value of the intensity of the electromagnetic wave is larger toward the power line 2 and smaller away from the power line 2. This means that the intensity of the electromagnetic wave corresponds to a distance from the power line 2. Therefore, although details will be described later, the work machine 1 can travel at a position away from the power line 2 by a desired position. This can be realized based on the function of the acquisition unit 14 as a detection unit described above.

The station 3 is electrically connected to the power line 2 and supplies, as described above, power to the power line 2 such that the power line 2 generates an electromagnetic wave. In addition, the station 3 can cause the work machine 1 to stand by while work is not being executed and charges the battery 17 of the work machine 1 during that time. From this viewpoint, the station 3 may be expressed as a charging station or the like.

In the present embodiment, the power line 2 is annularly installed in the work region WR via the station 3. Therefore, it can be said that the work region WR includes an inner region WR1 and an outer region WR2, and they are partitioned by the power line 2 installed annularly. In addition, it is assumed that a positive magnetic field is generated by the power line 2 in the inner region WR1 and that a negative magnetic field is generated by the power line 2 in the outer region WR2 (see FIGS. 3A and 3B).

With such a configuration, the work machine 1 executes work in the work region WR while traveling in the work region WR based on the electromagnetic wave generated by the power line 2.

Travel Routes During Work

Figure 4:
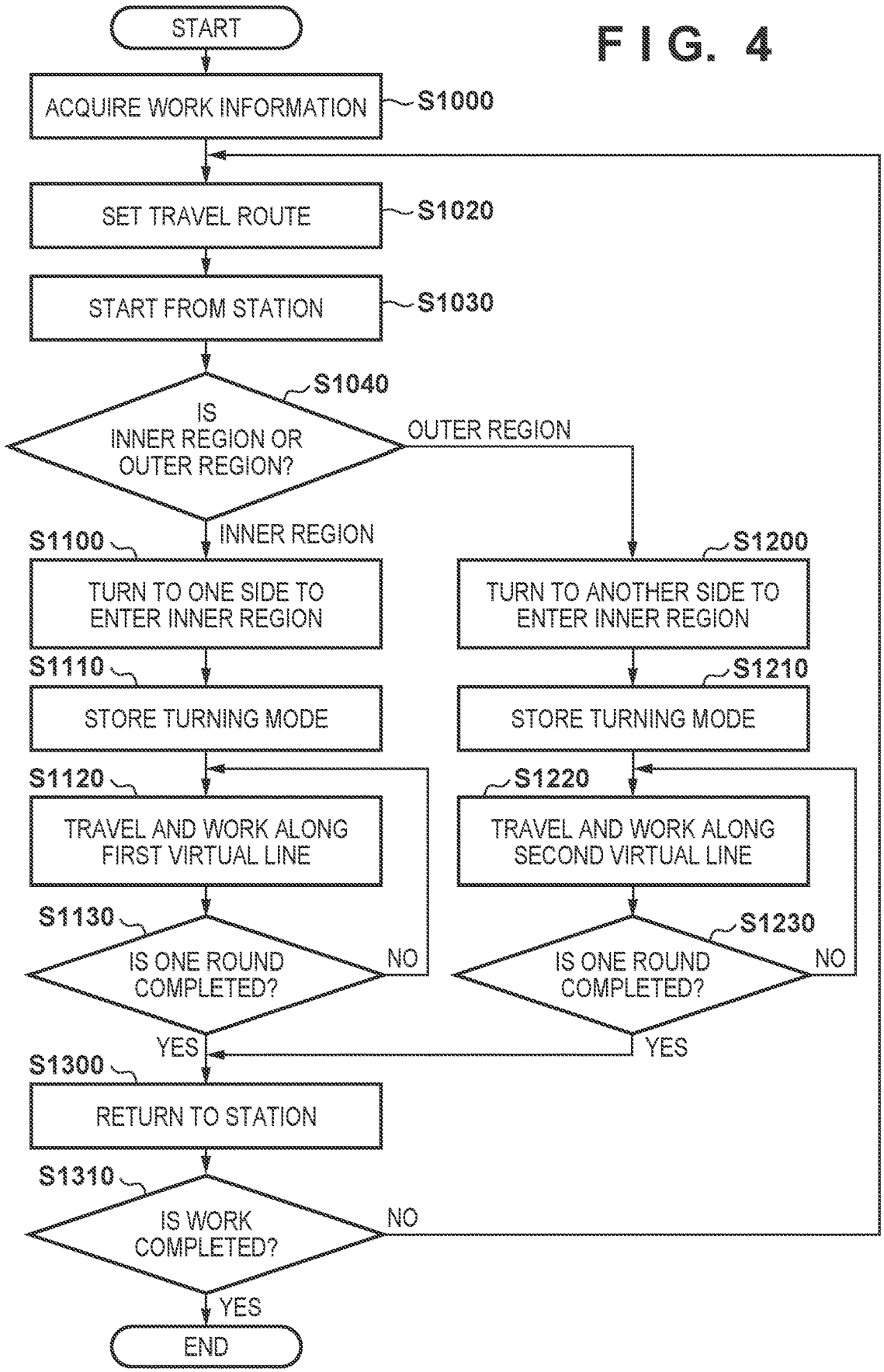
FIG. 4 is a flowchart illustrating an example of a work mode.

FIG. 4 is a flowchart illustrating an example of a work mode according to the present embodiment. This flowchart is mainly executed by the control device 16 at start of work by the work machine 1, and an outline of the flowchart is that the work machine 1 is caused to selectively travel in the inner region WR1 and the outer region WR2 so that the work machine 1 travels along a virtual line parallel to the power line 2.

In Step S1000 (hereinafter referred to as "S1000". The same applies to other steps to be described later), work information input in advance by a user of the work machine 1 (or an owner of the work region WR) is acquired. The work information indicates conditions necessary for execution of work by the work machine 1 (for example, a shape of the work region WR, a relative position of the power line 2 in the work region WR, and the like). In the present embodiment, based on this work information, a selection instruction signal SIG1 and a distance setting signal SIG2 are set. The selection instruction signal SIG1 is a signal that instructs to select one of the inner region WR1 and the outer region WR2. The distance setting signal SIG2 is a signal for setting a distance from the power line 2.

The selection instruction signal SIG1 and the distance setting signal SIG2 are, in the present embodiment, indicate:

| SIG1 | SIG2 |
|---|---|
| WR1 | 1 |
| . | . |
| . | . |
| . | . |
| WR1 | K1 (K1 is an integer of 2 or more.) |
| WR2 | 1 |
| . | . |
| . | . |
| . | . |
| WR2 | K2 (K2 is an integer of 2 or more.) |
| WR1 (WR2) | 0 |

More specifically, the signals SIG1 and SIG2 are to be selectively set so as to satisfy any one of (a) to (c) described below:

(a) The selection instruction signal SIG1 instructs to select the region WR1, and the distance setting signal SIG2 indicates any one of "1" to "K1";

(b) The selection instruction signal SIG1 instructs to select the region WR2, and the distance setting signal SIG2 indicates any one of "1" to "K2"; or (c) The selection instruction signal SIG1 instructs to select the region WR1 (or WR2), and the distance setting signal SIG2 indicates "0".

As an example, in a case where the selection instruction signal SIG1 instructs to select the region WR1 and the distance setting signal SIG2 indicates "1", the work machine 1 travels on a route away from the power line 2 on a side of the inner region WR1 by 1×d (unit is, for example, centimeters. Besides, d is a parameter corresponding to, for example, a width of the work unit 13.).

As another example, in a case where the selection instruction signal SIG1 instructs to select the region WR2 and the distance setting signal SIG2 indicates "2", the work machine 1 travels on a route away from the power line 2 on a side of the outer region WR2 by 2×d.

As still another example, in a case where the selection instruction signal SIG1 instructs to select the region WR1 (or WR2) and the distance setting signal SIG2 indicates "0", the work machine 1 travels immediately above the power line 2.

As described above, the signals SIG1 and SIG2 are set based on the work information input in advance by a user. For example, since the distance from the power line 2 indicated by the distance setting signal SIG2 is determined by this work information, it can be said as one of a plurality of distances by operationally input by a user.

As another embodiment, the above (c) may be included in, for example, (a), (a) the selection instruction signal SIG1 may instruct to select the region WR1, and the distance setting signal SIG2 may indicate any one of "0" to "K1", and (b) the selection instruction signal SIG1 may instruct to select the region WR2, and the distance setting signal SIG2 may indicate any one of "1" to "K2".

As another embodiment, the signals SIG1 and SIG2 may be combined into a single signal SIG0. As an example, the signal SIG0 may indicate "+K1", . . . , "+2", "+1", "±0", "−1", "−2", . . . , and "−K2". In this case, it is assumed that polarities of "+" and "−" correspond to the regions WR1 and WR2, respectively. For example, "+1" indicates traveling on a route away from the power line 2 by 1×d on the side of the inner region WR1, "−2" indicates traveling on a route away from the power line 2 by 2×d on the side of the outer region WR2, and "±0" indicates traveling immediately above the power line 2.

In S1020, a travel route of the work machine 1 is set based on the signals SIG1 and SIG2. For example, it is determined based on the selection instruction signal SIG1 whether to travel in the region WR1 or the region WR2, and a distance from the power line 2 at that time is determined based on the distance setting signal SIG2.

In S1030, the work machine 1 is started from the station 3.

In S1040, based on the selection instruction signal SIG1, it is determined which of the regions WR1 and WR2 the work machine 1 travels in. When it is determined that the work machine 1 travels in the inner region WR1, the processing proceeds to S1100, and when it is determined that the work machine 1 travels in the outer region WR2, the processing proceeds to S1200.

In S1100, the work machine 1 is turned to one side (for example, a left side) to enter the inner region WR1 and moved to a position away from the power line 2 by a distance indicated by the distance setting signal SIG2.

In S1110, information indicating a turning mode of the work machine 1 in S1100 described above is stored in the storage unit 15. The information stored here indicates a travel mode (for example, a turning angle or a turning radius, and a moving distance) of the work machine 1 moving from the station 3 to the position in S1100 and can be used, for example, in S1300 (return to the station 3) described later.

In S1120, the work machine 1 is caused to travel so as to maintain a position away from the power line 2 on the side of the inner region WR1 by the distance indicated by the distance setting signal SIG2. This is realized by the function of the acquisition unit 14 as a detection unit, that is, the travel control of the work machine 1 is performed so that a detection value of the intensity of the electromagnetic wave is maintained at a desired value. As a result, the work machine 1 executes work while traveling along a virtual line (set as a virtual line L1) away from the power line 2 on the side of the inner region WR1 by the distance indicated by the distance setting signal SIG2. Note that the virtual line L1 is parallel to the power line 2.

In S1130, it is determined whether the work machine 1 has made one round of (the inner region WR1 of) the work region WR by traveling along the virtual line L1. If the one round is completed, the processing proceeds to S1300, and if not, the processing returns to S1120 (that is, S1120 is repeatedly performed until the round is completed.).

It is only necessary that S1200 to S1230 be performed for the outer region WR2 similarly to S1100 to S1130 described above. In other words, in S1200, the work machine 1 is turned to another side (for example, a right side) to enter the outer region WR2 and moved to a position away from the power line 2 by the distance indicated by the distance setting signal SIG2. In S1210, information indicating a turning mode of the work machine 1 in S1200 described above is stored in the storage unit 15. In S1220, the work machine 1 is caused to travel along a virtual line (set as a virtual line L2) away from the power line 2 on the side of the outer region WR2 by the distance indicated by the distance setting signal SIG2, and the work machine 1 is caused to execute work. Note that the virtual line L2 is parallel to the power line 2. In S1230, it is determined whether the work machine 1 has made one round of (the outer region WR2 of) the work region WR by traveling along the virtual line L2. If the one round is completed, the processing proceeds to S1300, and if not, the processing returns to S1220.

In S1300, the work machine 1 is returned to the station 3. An entry route to the station 3 can be determined based on the information stored in the storage unit 15 in S1110 or S1210 (information indicating the turning mode of the work machine 1 in S1100 or S1200). In addition, the station 3 generates another electromagnetic wave different from the power line 2, and the work machine 1 can, when approaching the station 3, enter the station 3 based on the another electromagnetic wave.

In S1310, it is determined whether work for all of the work region WR has been completed. If work is completed, the present flowchart is ended, and if not, the processing returns to S1020.

In a case where the processing returns to S1020 (that is, in a case where the work is not completed), in S1020, the signals SIG1 and SIG2 are changed so that remaining work (work in parts of the work region WR where work is not completed) is executed. As a result, another travel route is newly set (updating (resetting) of a travel route). Thereafter, in S1030 to S1230, the work machine 1 travels along the updated travel route to execute the remaining work.

In the present embodiment, the signals SIG1 and SIG2 are selectively set so as to satisfy any one of (a) to (c) described above. Consequently, the station 3 can manage which part of the work region WR has been worked by using the signals SIG1 and SIG2. Progress of such work may be managed by the control device 16 and the storage unit 15 in the work machine 1.

Note that, in a case where the processing returns to S1020, the signals SIG1 and SIG2 instruct to change a travel route (since the signals SIG1 and SIG2 can have values different from previous values), and thus, from this viewpoint, the signals can also be referred to as change instruction signals.

Figure 5:
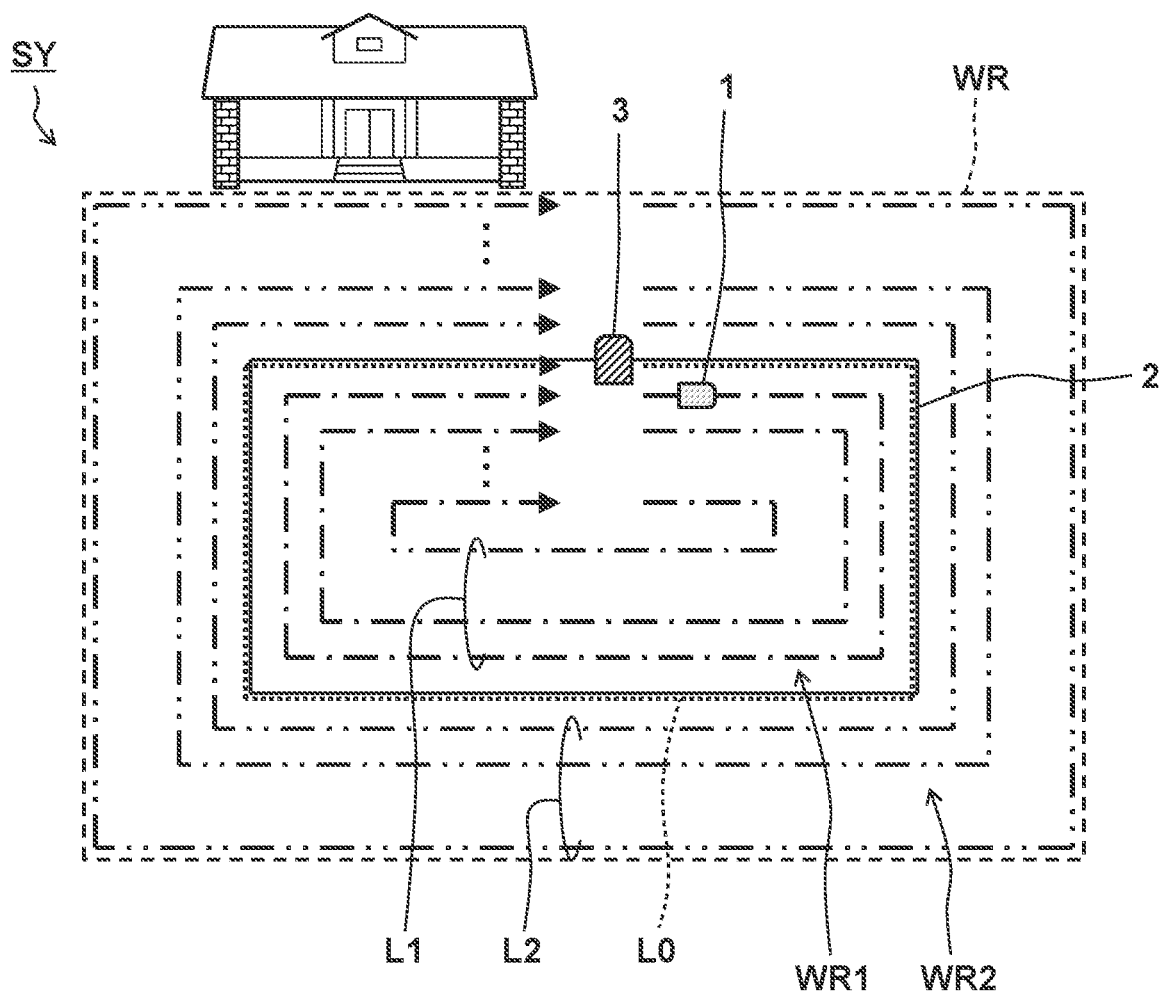
FIG. 5 is a schematic diagram illustrating an example of a work mode.

FIG. 5 is a schematic diagram illustrating an example of a work mode of the work machine 1 based on this flowchart. In the drawing, arrows of one-dot chain lines indicate a travel route of the work machine 1 according to the virtual line L1 (corresponding to (a) described above). Arrows of two-dot chain lines indicate a travel route of the work machine 1 according to the virtual line L2 (corresponding to (b) described above). An arrow of broken chain lines indicates a travel route of the work machine 1 according to the virtual line L0 immediately above the power line 2 (corresponding to (c) described above).

The above (a) to (c) may be performed in any order. For example, regardless of the selection instruction signal SIG1, the distance setting signal SIG2 may be set so as to be selected in descending order or in ascending order of distance from the power line 2. For example, for both the regions WR1 and WR2, work may be executed in order from a travel route far from the power line 2 or may be executed in order from a travel route close to the power line 2. Alternatively, they may be executed in any order.

BRIEF SUMMARY

As described above, according to the present embodiment, the work machine 1 makes one around in (the inner region WR1 of) the work region WR along the virtual line L1 parallel to the power line 2 by the control based on S1100 to S1130. In addition, the work machine 1 makes one around in (the outer region WR2 of) the work region WR along the virtual line L2 parallel to the power line 2 by the control based on S1200 to S1230. Then, in S1020 and S1040, works on both sides of the power line 2 can be executed by selectively performing these two controls. In this manner, the work machine 1 can complete the work in the work region WR by circling around the work region WR on a plurality of travel routes set in parallel to the power line 2.

Note that, here, an aspect has been exemplified in which the work machine 1 returns to the station 3 every time the work machine 1 makes one round in the work region WR. However, the work machine 1 may return to the station 3 when making N rounds in the work region WR (N is an integer of 2 or more and (K1+K2+1) or less.).

Although described below with some examples, according to the present embodiment, the power line 2 can be relatively easily installed even when the work region WR becomes complicated (for example, when the work region WR is formed in a passage shape). Further, according to the present embodiment, work efficiency of the complicated work region WR can be relatively easily improved.

First Example

Figure 6:
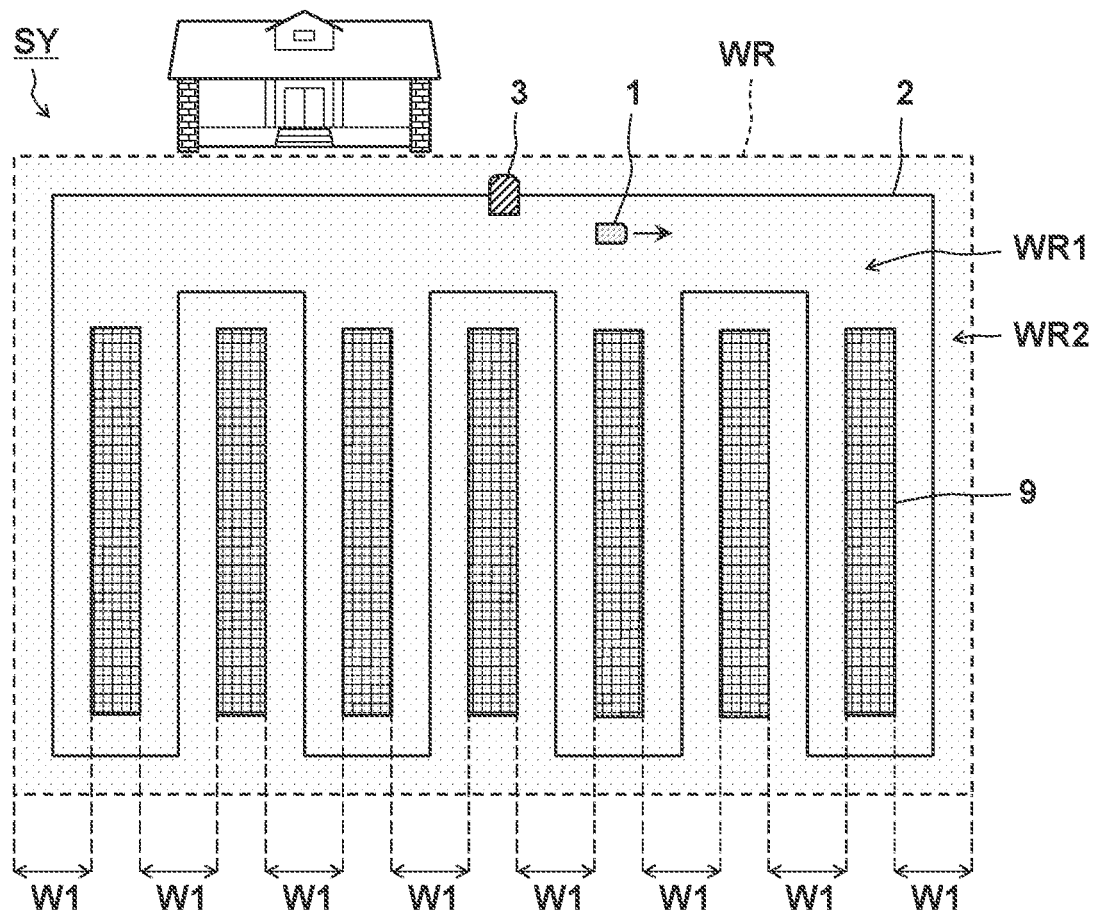
FIG. 6 is a schematic diagram illustrating an example of a work mode.

FIG. 6 illustrates a configuration example of the work system SY as a first example. In the present example, a plurality of obstacles 9 is arranged at predetermined intervals in the work region WR. Here, a distance between two obstacles 9 adjacent to each other is a distance W1. Therefore, the work region WR is at least partially formed in a passage shape due to the arrangement of the obstacles 9.

Typical examples of the work region WR like this include a solar power plant in which a plurality of solar panels is arranged, an orchard in which a plurality of trees is arranged, and the like. Note that the passage here means that the passage is narrower than other portions, and a length in an extending direction is irrelevant.

In the work region WR like this, the work machine 1 needs to execute work while avoiding the obstacles 9. According to the flowchart described above (see FIG. 4), by setting K1 and K2 so as to be $K1 \times d = W1/2$, and $K2 = K1$, it is possible to appropriately execute work for the regions among the obstacles 9 in the work region WR.

In the present embodiment, K1=K2, but K1≠K2 may be set as necessary. More specifically, one of the virtual lines L1, with a farthest distance to the power line 2 and one of the virtual lines L2, with a farthest distance to the power line 2 may be different from each other in distance. In this case, the work in the work region WR by the work machine 1, which can be difficult in a conventional installation mode of the power line 2, can be realized relatively easily. For example, when another obstacle is fixedly installed in the work region WR, the work machine 1 can execute work while avoiding the another obstacle by setting K1 and/or K2 at values different from each other. In addition, in this case, the power line 2 can be installed relatively short, which can also be advantageous in reducing cost of the work system SY.

Second Example

Figure 7:
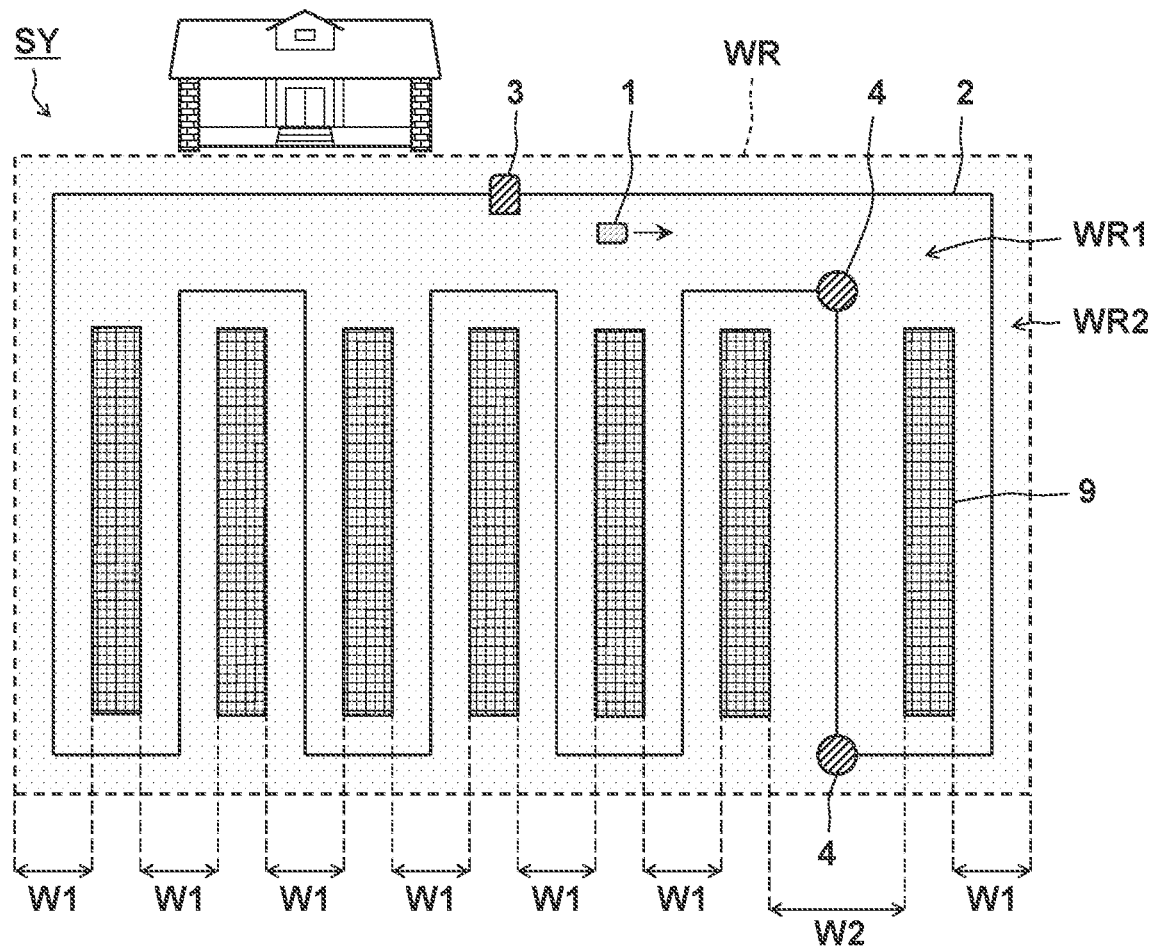
FIG. 7 is a schematic diagram illustrating an example of a work mode.

FIG. 7 illustrates a configuration example of the work system SY according to a second example. In the present example, some of the plurality of obstacles 9 are disposed separately compared with the others. In other words, among the plurality of obstacles 9, certain two obstacles 9 are disposed adjacent to each other so as to be separated by a distance W2 (>W1), and other obstacles are arranged so that two adjacent obstacles are separated by the distance W1.

In such a case, according to the first example described above, work is not sufficiently executed in a region between the two obstacles 9 separated by the distance W2.

Therefore, in the present example, a unit 4 that generates a change instruction signal SIG3 is further installed in the work region WR. In the present example, the unit 4 is a substation electrically connected to the power line 2 but may be provided in an electric system different from the power line 2 and may be a signal source that generates another signal such as a beacon. Alternatively, the unit 4 may be a simple landmark such as a pole.

Here, it is assumed that two units 4 are installed. The work machine 1 temporarily changes a travel route, when detecting the change instruction signal SIG3 (set as a signal SIG3a, for distinction) generated by the units 4 by the function of the acquisition unit 14 as a detection unit, and returns the travel route to an original one when detecting the change instruction signal SIG3 (set as a signal SIG3b, for distinction) generated by the units 4. With such a configuration, between the two units 4, travel control based on the signals SIG1 and SIG2 is temporarily interrupted, and work can be sufficiently performed even in a region between the two obstacles 9 separated by the relatively large distance W2.

The change instruction signal SIG3a may be any signal as long as it instructs to interrupt the travel control based on the signals SIG1 and SIG2 and may be, for example, a signal that changes a signal value of the signal SIG1 and/or SIG2. Incidentally, the change instruction signal SIG3a may instruct to reciprocate between the two units 4. Alternatively, the change instruction signal SIG3a may instruct to perform another known travel control (for example, traveling on an arbitrary route between the two units 4 until the change instruction signal SIG3b is received or over a predetermined period.).

In addition, the change instruction signal SIG3b may stop an instruction indicated by the change instruction signal SIG3a and instruct to resume travel control based on the signals SIG1 and SIG2.

According to the present example, it can be said that it is advantageous for improving work efficiency even in a case where the work region WR is further complicated. In the present example, each unit 4 is connected to the station 3 via the power line 2 and has a part of functions of the station 3. Therefore, progress of work by the station 3 may be incidentally managed by the unit 4.

Third Example

In the above-described flowchart (see FIG. 4, S1020), a mode has been exemplified in which the travel route is updated every time the work machine 1 makes one round in the work region WR, that is, every time the work machine 1 returns to the station 3, but this update may be performed by another method. For example, the updating of the travel route may be performed by the change instruction signal SIG3 by the unit 4 exemplified in the second example or may be performed based on a lapse of a predetermined time.

Figure 8:
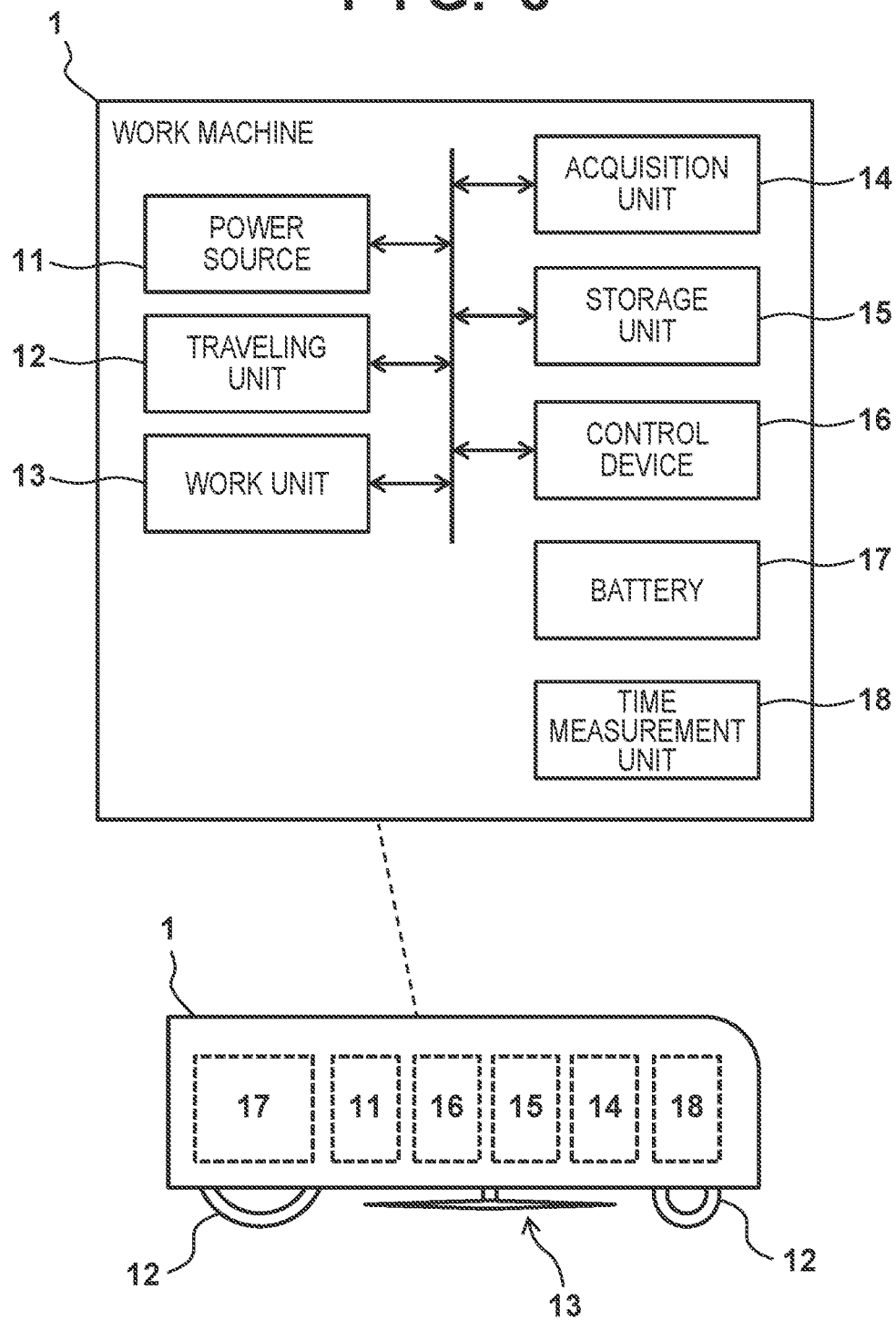
FIG. 8 is a diagram illustrating a configuration example of a work machine.

As illustrated in FIG. 8, in a third example, the work machine 1 further includes a time measurement unit 18 that measures working hours. When setting a travel route based on a lapse of a predetermined time, the work machine 1 can acquire, through the acquisition unit 14, a measurement result of working hours by the time measurement unit 18, thereby updating a travel route.

The present embodiment has been described with some examples, but according to the present embodiment, even when the work region WR becomes complicated, the power line 2 can be relatively easily installed, and the work efficiency of the complicated work region WR can be relatively easily improved. The examples and modifications exemplified herein may be modified, partially combined, or combined with known ones without departing from the gist thereof.

Miscellaneous

In the above descriptions, in order to facilitate understanding, each element has been described with a name related to its functional aspect. However, each element is not limited to one having, as a main function, the function described in the embodiments and may be one having the function auxiliarily.

In addition, in the embodiments, a lawn mower has been exemplified as the work machine 1, but the work machine 1 is not limited to a lawn mower. More specifically, contents of the embodiments are also applicable to a snow blower including an auger as the work unit 13 or are also applicable to an agricultural work machine such as a cultivator.

SUMMARY OF EMBODIMENTS

A first aspect relates to a control device (for example, 16), and the control device is for performing travel control of a work machine (for example 1), the work machine executes work while traveling in a work region (for example, WR) based on a reference line (for example, 2) installed in the work region; and the control device includes: a setting unit (for example, S1010) that sets a distance from the reference line; a first control unit (for example, S1120) that controls the work machine to travel along a first virtual line (for example, L1), the first virtual line being a virtual line away from the reference line on one side by the distance set by the setting unit; a second control unit (for example, S1220) that controls the work machine to travel along a second virtual line (for example, L2), the second virtual line being a virtual line away from the reference line on another side by the distance set by the setting unit; and a selection unit (for example, S1040) that selects one of the control by the first control unit and the control by the second control unit.

According to the first aspect, a reference line (a power line in an embodiment) can be relatively easily installed even when a work region becomes complicated, and work efficiency of the complicated work region can be relatively easily improved.

In a second aspect, the selection unit is configured to be capable of changing from one of the control by the first control unit and the control by the second control unit to another one.

According to the second aspect, works on both sides of a reference line can be appropriately executed.

In a third aspect, a first detection unit (for example, S1000, S1020) that detects a signal instructing the change by the selection unit is further included and that the selection unit makes the change based on a detection result by the first detection unit.

According to the third aspect, a travel route can be appropriately set.

In a fourth aspect, the setting unit is configured to be capable of changing a distance from the reference line.

According to the fourth aspect, a travel route can be appropriately set.

In a fifth aspect, a second detection unit (for example, S1000, S1010) that detects a signal instructing the change by the setting unit is further included and that the setting unit makes the change based on a detection result by the second detection unit.

According to the fifth aspect, a travel route can be appropriately set.

In a sixth aspect, the distance from the reference line is one of a plurality of distances operationally input by a user, that the control device further includes an acquisition unit (for example, S1000) that acquires information indicating the plurality of distances, and that the setting unit makes the change based on the information acquired by the acquisition unit.

According to the sixth aspect, a travel route can be appropriately set.

In a seventh aspect, the setting unit makes the change based on the information acquired by the acquisition unit so as to select a distance in descending order or in ascending order from among the plurality of distances.

According to the seventh aspect, a travel route can be set relatively easily.

In an eighth aspect, the work region is provided with a unit (for example, 3, 4) that generates a signal instructing the change by the selection unit and/or the setting unit, with the selection unit and/or the setting unit making the change based on a signal from the unit.

According to the eighth aspect, work efficiency can be improved even when a work region becomes further complicated.

In a ninth aspect, a time measurement unit (for example, 14) that measures working hours is further included and that the selection unit and/or the setting unit makes the change based on a measurement result by the time measurement unit.

According to the ninth aspect, work efficiency can be improved even when a work region becomes further complicated.

In a tenth aspect, the selection unit and/or the setting unit makes the change in response to completion of traveling of the work machine based on one of the control by the first control unit and the control by the second control unit.

According to the tenth aspect, a travel route can be set relatively easily.

In an eleventh aspect, the reference line is configured to be capable of generating a signal, the signal having a smaller value as away from the reference line, and a value of the signal corresponding to a distance from the reference line set by the setting unit.

According to the eleventh aspect, a work machine can appropriately travel along a desired travel route.

In a twelfth aspect, the reference line is a power line (for example, 2) that generates an electromagnetic wave as the signal.

According to the twelfth aspect, a work machine can appropriately travel along a desired travel route.

A thirteenth aspect relates to a work machine (for example, 1), and the work machine includes: the control device (for example, 16); a traveling unit (for example, 12) for causing the work machine to travel; and a work unit (for example, 13) for executing the work.

In short, the control device described above can be appropriately applied to a known work machine.

A fourteenth aspect relates to a work system (for example, SY), and the work system includes: the above-described work machine (for example, 1); a power line (for example, 2) as the reference line; and a station (for example, 3) configured to be capable of supplying power to the power line.

In a word, the work machine described above can be appropriately applied to a known work system.

In a fifteenth aspect, the power line is annularly installed in the work region via the station, that the first control unit performs the control such that the work machine makes one round in the work region along the first virtual line, and that the second control unit performs the control such that the work machine makes one round in the work region along the second virtual line.

According to the fifteenth aspect, the fourteenth aspect described above can be appropriately realized.

In a sixteenth aspect, the first control unit and the second control unit return the work machine to the station when the work by the work machine in the work region is completed.

According to the sixteenth aspect, a work machine that has completed work can be caused to stand by at a station.

In a seventeenth aspect, the work region includes an inner region (for example, WR1) and an outer region (for example, WR2) partitioned by the power line installed in the annular shape, that a region where the work machine travels based on the control by the first control unit corresponds to one region of the inner region and the outer region, and that a region where the work machine travels based on the control by the second control unit corresponds to another region of the inner region and the outer region.

According to the seventeenth aspect, the fourteenth aspect described above can be appropriately realized.

In an eighteenth aspect, the control device further includes: a first turning unit (for example, S1100) that turns the work machine to one side such that the work machine enters the one region from the station; and a second turning unit (for example, S1200) that turns the work machine to another side such that the work machine enters the another region from the one region after the work in the one region is completed.

According to the eighteenth aspect, a work machine can be appropriately started from a station.

In a nineteenth aspect, the control device further includes a storage unit (for example, 15, S1120, S1220) that stores a turning direction of the work machine by the first turning unit.

According to the nineteenth aspect, a work machine can be appropriately returned to a station.

In a twentieth aspect, the work region is at least partially formed in a passage shape.

According to the twentieth aspect, even in such a work region, work efficiency can be improved.

The invention is not limited to the foregoing embodiments, and various variations/changes are possible within the spirit of the invention.

The invention claimed is:

1. A control device for performing travel control of a work machine, the work machine executes work while traveling in a work region based on a reference line installed in the work region, and the control device comprises:
   a setting unit that sets a distance from the reference line;
   a first control unit that controls the work machine to travel along a first virtual line, the first virtual line being a virtual line away from the reference line on one side by the distance set by the setting unit;
   a second control unit that controls the work machine to travel along a second virtual line, the second virtual line being a virtual line away from the reference line on another side by the distance set by the setting unit; and
   a selection unit that selects one of the control by the first control unit and the control by the second control unit, wherein
   the setting unit is configured to be capable of changing a distance from the reference line,
   the distance from the reference line is one of a plurality of distances operationally input by a user,
   the control device further comprises an acquisition unit that acquires information indicating the plurality of distances, and
   the setting unit makes the change based on the information acquired by the acquisition unit.

2. The control device according to claim 1, wherein the selection unit is configured to be capable of changing from one of the control by the first control unit and the control by the second control unit to another one.

3. The control device according to claim 2, wherein the control device further comprises a first detection unit that detects a signal instructing the change by the selection unit, and
   the selection unit makes the change based on a detection result by the first detection unit.

4. The control device according to claim 2, wherein the work region is provided with a unit that generates a signal instructing the change by the selection unit and/or the setting unit, with the selection unit and/or the setting unit making the change based on the signal from the unit.

5. The control device according to claim 2, wherein the selection unit and/or the setting unit makes the change in response to completion of traveling of the work machine based on one of the control by the first control unit and the control by the second control unit.

6. The control device according to claim 1, wherein the control device further comprises a second detection unit that detects a signal instructing the change by the setting unit, and
   the setting unit makes the change based on a detection result by the second detection unit.

7. The control device according to claim 1, wherein the setting unit makes the change based on the information acquired by the acquisition unit so as to select a distance in descending order or in ascending order from among the plurality of distances.

8. The control device according to claim 1, wherein the reference line is configured to be capable of generating a signal, the signal having a smaller value as the distance from the reference line increases, and a value of the signal corresponding to a distance from the reference line set by the setting unit.

9. The control device according to claim 8, wherein the reference line is a power line that generates an electromagnetic wave as the signal.

10. A work machine comprising:
    the control device according to claim 1;
    a traveling unit for causing the work machine to travel; and
    a work unit for executing the work.

11. A work system comprising:
    the work machine according to claim 10;
    a power line as the reference line; and
    a station configured to be capable of supplying power to the power line.

12. The work system according to claim 11, wherein the power line is annularly installed in the work region via the station,
    the first control unit performs the control such that the work machine makes one round in the work region along the first virtual line, and
    the second control unit performs the control such that the work machine makes one round in the work region along the second virtual line.

13. The work system according to claim 12, wherein the first control unit and the second control unit return the work machine to the station when the work by the work machine in the work region is completed.

14. The work system according to claim 12, wherein the work region includes an inner region and an outer region partitioned by the power line installed in the annular shape,
    a region where the work machine travels based on the control by the first control unit corresponds to one region of the inner region and the outer region, and
    a region where the work machine travels based on the control by the second control unit corresponds to another region of the inner region and the outer region.

15. The work system according to claim 14, wherein the control device further comprises:
    a first turning unit that turns the work machine to one side such that the work machine enters the one region from the station; and
    a second turning unit that turns the work machine to another side such that the work machine enters the another region from the one region after the work in the one region is completed.

16. The work system according to claim 15, wherein the control device further comprises a storage unit that stores a turning direction of the work machine by the first turning unit.

17. A control device for performing travel control of a work machine, the work machine executes work while traveling in a work region based on a reference line installed in the work region, and the control device comprises:
    a setting unit that sets a distance from the reference line;
    a first control unit that controls the work machine to travel along a first virtual line, the first virtual line being a virtual line away from the reference line on one side by the distance set by the setting unit;

a second control unit that controls the work machine to travel along a second virtual line, the second virtual line being a virtual line away from the reference line on another side by the distance set by the setting unit, a selection unit that selects one of the control by the first control unit and the control by the second control unit; and a time measurement unit that measures working hours, and wherein, the selection unit is configured to be capable of changing from one of the control by the first control unit and the control by the second control unit to another one, and the selection unit and/or the setting unit makes the change based on a measurement result by the time measurement unit.

18. A work system, comprising:

a work machine configured to execute work while traveling in a work region based on a reference line installed in the work region;

a power line as the reference line; and a station configured to be capable of supplying power to the power line, wherein the work machine comprises a control device, a traveling unit for causing the work machine to travel, and a work unit for executing the work, the control device comprises:
- a setting unit that sets a distance from the reference line;
- a first control unit that controls the work machine to travel along a first virtual line, the first virtual line being a virtual line away from the reference line on one side by the distance set by the setting unit;
- a second control unit that controls the work machine to travel along a second virtual line, the second virtual line being a virtual line away from the reference line on another side by the distance set by the setting unit; and
- a selection unit that selects one of the control by the first control unit and the control by the second control unit, the power line is annularly installed in the work region via the station, the first control unit performs the control such that the work machine makes one round in the work region along the first virtual line, the second control unit performs the control such that the work machine makes one round in the work region along the second virtual line, the work region includes an inner region and an outer region partitioned by the power line installed in the annular shape, a region where the work machine travels based on the control by the first control unit corresponds to one region of the inner region and the outer region, a region where the work machine travels based on the control by the second control unit corresponds to another region of the inner region and the outer region, and the control device further comprises:
- a first turning unit that turns the work machine to one side such that the work machine enters the one region from the station; and
- a second turning unit that turns the work machine to another side such that the work machine enters the another region from the one region after the work in the one region is completed.

* * * * *